June 11, 1963 J. M. HELLA ET AL 3,093,533
PRODUCTION OF FIBERBOARD CONTAINING MINERAL FIBER
Filed Feb. 1, 1960
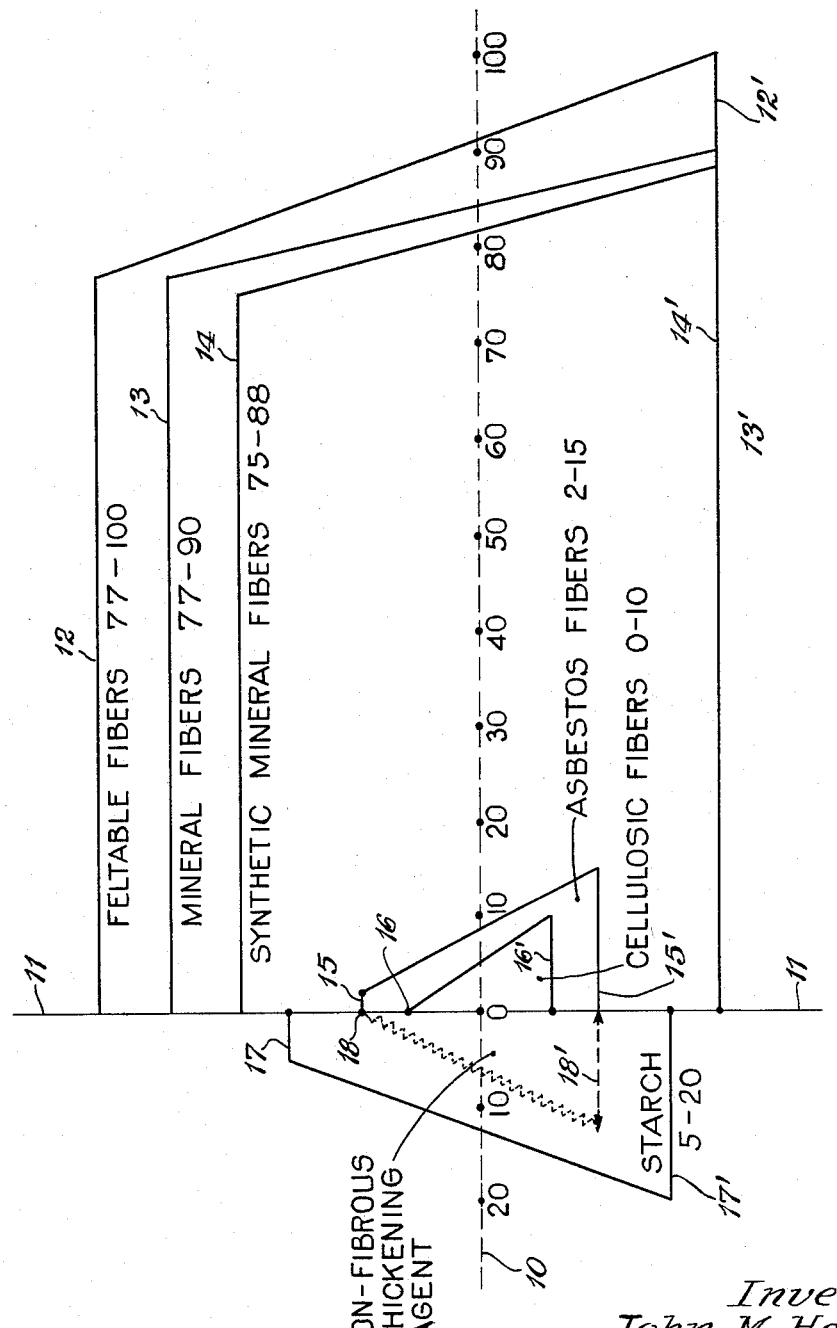
Inventors
John M. Hella
Steve H. Wise
by W. Bartlett Jones,
Attorney

United States Patent Office 3,093,533
Patented June 11, 1963

3,093,533
PRODUCTION OF FIBERBOARD CONTAINING MINERAL FIBER
John M. Hella and Steve H. Wise, Cloquet, Minn., assignors to Wood Conversion Company, St. Paul, Minn., a corporation of Delaware
Filed Feb. 1, 1960, Ser. No. 5,809
3 Claims. (Cl. 162—145)

The present invention relates generally to the manufacture of handleable fire-retardant fiberboard having synthetic mineral fiber as the essential ingredient thereof, and in particular to the type having acoustical properties.

The term "synthetic mineral fibers" is used herein to define mineral fibers produced by attenuating molten mineral particles as in forming glass wool, slag wool, rock wool, limestone wool and the like. Such term excludes natural mineral fibers in order to distinguish, especially, two kinds of mineral fibers having distinctive properties. Natural mineral fibers, such as the numerous varieties of asbestos assimilate water and form a gel surface impeding the drainage of an aqueous slurry containing them. Synthetic mineral fibers for the present invention do not so assimilate water and gelatinize with the result that a slurry consisting only of such fiber in water is readily dewatered by drainage or suction, whereas slurries containing gelatinized asbestos fibers drain more slowly on account of the gelatinization, comparable to the effect of hydrated cellulose fibers in paper-making.

In making a rigid board of synthetic mineral fibers, the conventional procedures may be used. These include filtering water from an aqueous slurry of the fibers, in a batch process, or in a continuous process, as on a Fourdrinier machine, or a cylinder machine, and drying the dewatered felt. But, a binder for the fibers is essential to give adequate strength for commercial usage as rigid board.

Numerous materials are available as binders, such as soluble aqueous adhesives or colloidal materials, suitable materials for these being proteins, gums, starches and soluble and dispersed synthetic resins. However, since a slurry of synthetic mineral fibers drains so freely, the presence of dissolved or colloidally dispersed binders in the slurry results in loss of much of it in the water drained away.

To provide a binder which is not ineffectually lost in the felting process, the present invention employs a combination of starch grains and a thickening agent. The thickening agent reduces the freeness of the stock so as to limit the flushing away of the starch grains in dewatering by natural draining, by suction, and by pressing. Since starch grains become freely suspended in water, the tendency to lose starch grains with water is great. It is difficult entirely to limit loss of starch grains which is greatest in the initial stages of the dewatering. The thickening agent is employed in amount according to the material used, so that at least 80% of the starch ingredient of the slurry is retained. Although thickening agent may be used in quantity to retain all of the starch grains, such quantity makes the stock too slow to drain by certain conventional apparatus. Accordingly, the preferred quantity of thickening agent is such as to retain 80% to 90% of the starch grains.

Numerous thickening agents are available varying from dispersed colloid-like substances to feltable fibers which have assimilated water to exhibit gels or gel-like surfaces. Among the latter fibers are cellulose fibers, such as cotton, wood fiber, semi-chemical pulp, and ordinary paper-making fibers. These swell in water, and may be processed to become hydrated and acquire gel-like surfaces, as is done in paper making. When not hydrated, the thickening action is a minor contribution, and the major contribution is to limit friability.

Among non-cellulosic fibers which are thickening agents in aqueous fiber slurries are the various types of asbestos. These are hydrated in water to a gel-like surface providing a desirable thickening agent and also providing additional mineral fiber content for the noncombustible content of a board. The presence of asbestos fibers in a wet felt of synthetic mineral fibers gives mechanical strength enabling the handling of the wet felt. As the asbestos fibers increase in length in a board subjected to a fire test, they provide more strength to minimize collapse of the board.

Asbestos has an advantage over non-fibrous thickening agents, such as bentonite, various water-soluble gums, certain proteins, such as gelatin and dispersed soy protein, certain cellulose derivatives, including carboxymethyl cellulose, pasted starch of normal starch grains or of chemically treated starch grains. Being fibrous and non-colloidal the asbestos is substantially entirely retained and homogeneously distributed in the mat being dewatered. Other non-fibrous thickening agents may be used with asbestos, and because they are available in forms having ranges of so-called viscosity characteristics, it is impossible to set any range of content for the present invention, except in terms of starch-retention, when so used in a particular furnish. The non-fibrous thickening agents have various other functions, such as density control or binding action, and for these functions the total content of thickening agent has a major proportion of asbestos and a minor proportion of non-fibrous agent, if any.

The synthetic mineral fiber content may be provided in individualized form, such as ordinary glass wool, or other separated synthetic mineral fibers. However, commercial forms now available are commonly nondulated bodies of mineral wool. They include ball-like felted lumps varying in size from about 1/8 to 1 inch in diameter which are easily handled because the nodules easily part from one another. The nodules are rather tightly felted masses of the fiber, and are a form resulting from operations to remove from the fine fibers the "shot" which attends formation of the fine fibers.

When nodulated fiber is employed, and when starch grains are employed, it is important to process the furnish to be dewatered to a substantially homogeneous condition. Accordingly, the nodules are agitated in water containing the starch grains in order to loosen and unfelt nodules in the water and to allow starch grains to penetrate residual nodules. The agitation completely unfelts some nodules and reduces the sizes of larger nodules so that in the slurry to be dewatered, any remaining nodules are more nearly of one size than in the commercial supply of nodules, and contain starch grains.

In agitating the nodules in water it is preferred that the consistency of the furnish so agitated be greater than that of the slurry to be dewatered. In consequence, the furnish in which the nodules are agitated is diluted with water for forming a felt. When forming a felt, as on a Fourdrinier machine, for example, the uniformity of the felt depends upon the uniformity of consistency in the slurry. By adding water to the original furnish, and by control means, such as a consistency meter, the consistency at the time of delivery of the slurry to the dewatering means may be controlled to uniformity.

Starch grains vary according to source as to the temperature at which they gelatinize or burst in water to provide starch paste for binder. The amount of water present also varies the gelatinizing temperature. In an excess of water pasted starch disperses as a colloidal sol, less water being needed as the temperature is increased, but in a non-suspending amount of water for starch grains, such as that amount held in the wet-felt to be dried, the starch forms a paste or viscous sol at its gelatinizing temperature which functions as binder. For this reason, it is important that starch grains be present within any nodules which exist in the wet felt. Otherwise, such nodules may be bound into the board only at or near their surfaces, with the result that they may be picked or may fall out in some circumstances.

In order that all the starch grains in the wet felt to be dried to a board may provide effective binder, the wet board is heated at least to a temperature for gelatinizing or pasting the starch grains in situ while the felt remains wet to provide a water supply for the paste. This is effected by first heating the wet felt throughout at least to a gelatinizing temperature in a humid atmosphere, thus avoiding drying surface fibers before the surface and the interior reach a gelatinizing temperature.

The furnish for the slurry may be prepared continuously or batchwise. In a continuous operation the solid components are continuously fed to water at controlled rates. In a batch process, using nodulated wool, it is preferred first to disperse the starch grains in water and then add the nodules. For agitating the suspension of nodules it is preferred that the thickening agent also be present. The resulting viscosity aids in reducing the nodule sizes during agitation. However, the primary aim of agitation is to individualize the fibers of nodules, to reduce the content of nodules, to loosen nodules, and at the same time, to move starch grains into resulting nodules which may remain. It is preferred to do this at a solids content or consistency of the furnish such that it may be reduced later for a controlled consistency of a slurry for felting. The furnish may be made at a consistency or content of solids in the range of from 2.5% to 6%, thus permitting reduction to a slurry consistency of 1% to 4%, depending upon the equipment for dewatering. Agitation, as by constant circulation of the furnish for about 30 minutes, is generally sufficient at a consistency of 2.5% to 6%. Above that range in such time, there is too much tendency to break mineral fibers from the nodules, and below that range, there is too little leeway for control of the slurry for felting.

Satisfactory results are obtained with 5 to 20 parts of starch grains, preferably 10 to 15 parts, and 77 to 100 parts of feltable fibers selected from the group consisting of mineral fibers, asbestos fibers, and cellulosic fibers and comprising from 77 to 90 parts of mineral fibers of which at least 75 parts are synthetic mineral fibers, and at least 2 parts are asbestos fibers. It is to be understood that cellulosic fibers may be present in addition to the mineral fibers. The cellulosic fibers, therefore, may be present in amount from 0 to 10 parts. Substantially unhydrated cellulosic fibers are used, such as short cotton fibers, sulfite fibers, kraft pulp, or other wood or vegetable matter cooked to cellulose pulp or semi-chemical pulp. Cellulosic fibers are important in a board of synthetic mineral fibers to lessen the friability thereof, and to make the board handleable, and therefore, less likely to be damaged in preparing and installing tile forms of the board.

Hydrated cellulosic fibers have a gel surface which is the "papermakers' bond," and hydrated cellulosic fibers function to slow the drainage rate as do the asbestos fibers. In the present invention, the starch is depended upon for binder, rather than the cellulosic fibers. Hydrated cellulosic fibers dry with increasing stiffness with increase in hydration. Because the cellulosic fibers are used to minimize friability, the substantially unhydrated forms thereof are tougher and less friable or brittle or stiff than are dried hydrated fibers, and therefore, they better perform the function for which they are used.

The chart in the drawing represents the ranges of content of the solid ingredients of the slurry to be dewatered as set forth above. In the drawing, the horizontal dotted line 10 is a reference line scaled in parts by weight, having pairs of parallel lines on its opposite sides. The vertical line 11 divides the ingredients into the feltable fibrous ones to the right and the non-fibrous ones to the left. Each pair of horizontal lines represents the range for an ingredient, designated as a specific ingredient or genericallly as a group of ingredients. That member of a pair of lines above the line 10 has a length corresponding to the minimum in its range of content, and that member of the pair below the line 10 has a length corresponding to the maximum of said range. The spacing of the lines vertically from the reference line 10 is of no significance.

The pair of lines 12 and 12' represents a range of 77 to 100 parts of feltable fibers, this group including essentially a minimum of 75 parts of synthetic mineral fibers, a minimum of 2 parts of asbestos fibers, and an optional content of cellulosic fibers.

The pair of lines 13 and 13' represents a range of 77 to 90 parts of mineral fibers, this group comprising the synthetic mineral fibers and the asbestos fibers. The range defined by lines 13 and 13' thus permits from 0 to 10 parts of cellulosic fibers.

The pair of lines 14 and 14' represents a range of 75 to 88 parts of synthetic mineral fibers, with which must be used at least two parts of asbestos fibers.

The pair of lines 15 and 15' represents a range of 2 to 15 parts of asbestos fibers, which function also as thickening agent.

Point 16 and line 16' represent a range from 0 to 10 parts of the optional cellulosic fibers.

To the left of line 11 the pair of lines 17 and 17' represents a range of 5 to 20 parts of starch grains.

Point 18 (at the zero-end of line 15) and line 18' define a range from 0 to an indeterminate limit representing a range of non-fibrous thickening agent, which may be used to supplement the thickening function of asbestos fibers to the extent, if necessary, to retain at least 80% of starch grains in dewatering the slurry. It is to be understood that this limit may extend so far as to make the slurry so thick that all of the starch grains are retained, and also so thick that the time required to dewater it is commercially impracticable but not impossible to practice. When the slurry is formed at some predetermined consistency for use with a particular dewatering apparatus, and the amount of asbestos is fixed in the formulation, it may be necessary to thicken the slurry additionally by use of one or more of the non-fibrous thickening agents, of which bentonite is preferred because of its inorganic character and its contribution to non-combustible content.

The following examples are illustrative, Example 1 being given in detail for a slurry dewatered on a Fourdrinier machine having a drainage section, a suction section, and a pressing section. Other examples are compounded for such machine, but it is to be understood that the consistency among other factors, may be varied when different apparatus is employed, for example, a cylinder felting machine, or a static batch filter.

EXAMPLE 1

| | Parts by weight |
|---|---|
| Nodulated slag wool | 80 |
| Sulfite cellulose fiber | 4.5 |
| Amosite fiber | 2.5 |
| Tapioca flour | 13.0 |
| Wax-size suspension (aqueous) | 1.0 |

The wax-size in the above is optional, but is conventional for imparting water-resistance to fiberboards. A suitable size is that disclosed in Olson U.S. No. 2,754,206.

All the ingredient except the mineral fibers are uniformly suspended in 2500 parts of water, and then the nodulated wool is added, followed by agitation for about 30 minutes, thus preparing a furnish for the stock chest of a Fourdrinier machine. Before the stock is fed to the screen, it passes through a dilution chamber wherein water is added to a selected uniform consistency in the range from 1% to 4%. As run on a screen traveling at 10 to 30 feet per minute, the deposit first drains freely through the screen in a draining section, then moves over a suction section, and then under a screen which moves with it through pressing rolls. The pressure rolls may exert slight pressure merely to level the top surface, or controlled pressure to express more water and densify the resulting wet felt. Without expressing any substantial amount of water, and with a solids content of the felt in the range of 35% to 40%, the felt will dry to a board having a density in the range of 12 to 14 lbs. per cu. ft. By expressing water to a solids content in the range of 45% to 50%, the felt will dry to a board having a density in the range of 17 to 19 lbs. per cu. ft. The expression of water may go higher, for example, to a solids content of 57% to 63% for drying to a board of 30 to 35 lbs. per cu. ft., in density. This density is relatively higher because mineral fibers are broken and the felting resulting lessened. For acoustical uses the density is preferred in the range from 12 to 25 lbs. per cu. ft.

The wet felt with or without the pressing, then enters an oven wherein the following conditions for drying are satisfactory: In a first zone, the atmosphere has a temperature of 340° to 385° F., with humidification by a water spray to effect a wet-bulb temperature of 140° F. The starch grains as employed gelatinize at about 138° F., so that the humidification assures gelatinizing of all the starch while the felt remains wet.

Then, in a second zone, the oven atmosphere is at a temperature in the range 365° to 385° F., for removing water and drying the board. In a third zone, the oven temperature is reduced to 315° to 360° F., and in an open section of the oven the dry board is allowed to cool to below 212° F. Then, the cooled board is trimmed or cut to tile or panels.

Additional formulations are given in Table I, wherein the proportions of ingredients are given in terms of the synthetic fibers expressed in its minimum content. Example 10 is the same as Example 5 with the parts changed but in the same proportion showing a total feltable fiber of 99 parts and the maximum cellulosic content at 10 parts.

*Table I*

In the following examples, 1% of said wax-size based on the weight of the fibers may be present as in Example 1.

The slurries are dewatered at 4% consistency.

|  | Parts by Weight | | | | | | | | |
|---|---|---|---|---|---|---|---|---|---|
| Example | 2 | 3 | 4 | 5 | 6 | 7 | 8 | 9 | 10 |
| Cellulosic [1] | 2.45 | 4 | ------ | 9 | 5 | 4.25K | 3 | 0 | 10 |
| Mineral Fiber: | | | | | | | | | |
| Synthetic | 75 | 75 | 75 | 75 | 75 | 75 | 75 | 75 | 83.5 |
| Asbestos | 4.75 | 4.12 | 5 | 6 | 2.5 | 4.25 | 2 | 15 | 6.6 |
| Starch [2] | 12.2 | { 4.1 / 8.2P } | }11.2 | 5 | 10 | 12.5 | 10 | 10 | 6.1 |
| Bentonite | 2.05 | 3 | ------ | ------ | ------ | 2.1 | 3 | 0 | 0 |
| Total Feltable Fiber | 82.2 | 83.1 | 80 | 90 | 82.5 | 83.5 | 80 | 90 | 100.1 |

[1] Sulfite, except K-Kraft.
[2] Tapioca, except P-Pearl starch gelatinizing at approximately 165° F.

The asbestos fiber has numerous functions. In forming the wet felt it is a thickening agent to slow the drainage time and retain starch, either alone or in conjunction with a lesser amount of non-fibrous thickening agent. It also adds to density of the dried board as its usage increases. In the wet felt its fibrous form gives mechanical tensile strength enabling it to be handled and moved, for example, from the forming screen to a conveyer for passing through a drying oven. In the finished board it increases the modulus of rupture and adds to the fire-retardancy whereas numerous non-fibrous thickening agents add to the combustible content.

The composition formulated in the foregoing description may have its 2 to 15 parts of asbestos present in a slurry having from 75 to 88 parts of the synthetic mineral fibers. In simplifying the range of proportion by taking synthetic mineral fiber content as 100, the range for asbestos fibers calculates to 2.27 to 20 parts, per 100 parts of the synthetic mineral fibers. The resulting thickening of the slurry by the asbestos participates in retention of starch grains which are freely suspended in the water of the slurry.

When synthetic mineral fiber is present in nodules thereof which have been opened up in the presence of suspended starch grains, so as to house starch grains in the nodules, there results another mechanism for retention of starch grains on dewatering. As the starch-containing nodules are tightened in forming the felt, the contained grains are more tightly held against loss.

Were starch used in colloidal form by pretreatment of starch grains, the colloidally suspended starch is lost in the water drained away, because it cannot be trapped or filtered from the water during the felting by dewatering the slurry.

The boards of the present invention are fire-retardant due to the high content of mineral fiber, and the low content of combustible matter which is the starch content and any content of cellulosic fibers. By decreasing the content of combustibles, boards may be made which meet certain standards of non-combustibility. The lower the density of the boards, the better they are in sound absorbency, but poorer in strength. A board lacking in cellulosic fiber is friable, and the more so the lower its density. Acoustical board is commonly cut into tiles with edges to be preserved for joining tile to tile. Cellulosic fiber is employed to decrease the friability, and thus provide acoustical tile that is readily handled without adverse friability.

In accordance with the invention herein described, fire-retardant mineral board may be readily produced, and especially produced with a density suitable for handleable acoustical tile.

We claim:
1. In the method of forming a fire-retardant mineral fiber board bonded by a binder consisting essentially of dried gelatinized starch by continuously dewatering an aqueous slurry containing said starch as raw starch grains, synthetic mineral fibers and a small quantity of asbestos fibers and thereby forming a wet fiber mat, the improvement in which said slurry contains solids consisting essentially of from 5 to 20 parts of said raw starch grains and from 77 to 100 parts of feltable fibers of which 77 to 90 parts are mineral fibers, in turn consisting of 75 to 88 parts of synthetic mineral fibers and from 2 to 15 parts of asbestos fibers for retaining at least 80% of said starch grains in dewatering, any remainder being substantially unhydrated cellulose fibers, gelatinizing the starch grains in situ in the wet mat by heating the wet mat throughout to at least the gelatinizing temperature for the starch, and drying the resulting wet mat containing said gelatinized starch as binder for the fibers.

2. In the method of forming a fire-retardant mineral fiberboard bonded by a binder consisting essentially of dried gelatinized starch by continuously dewatering an aqueous slurry containing said starch as raw starch grains, synthetic mineral fibers and a small quantity of asbestos fibers, and thereby forming a wet fiber mat, the improvement which comprises agitating a supply of synthetic mineral fibers in nodulated form in water containing raw starch grains and thereby in part defibering nodules and opening up residual nodules for receipt of starch grains within opened-up nodules, wherein said slurry contains solids consisting essentially of from 5 to 20 parts of the raw starch grains and from 77 to 100 parts of feltable fibers of which from 77 to 90 parts are mineral fibers, in turn consisting of 75 to 88 parts of the resulting synthetic mineral fibers and nodules, and from 2 to 15 parts of asbestos fibers for retaining at least 80% of said starch grains in dewatering, any remainder being substantially unhydrated cellulose fibers, gelatinizing the starch grains in situ in the wet mat by heating the wet mat throughout to at least the gelatinizing temperature for the starch, and drying the resulting wet mat containing said gelatinized starch as binder for the fibers.

3. In the method of forming a fire-retardant mineral fiberboard bonded by a binder consisting essentially of dried gelatinized starch by continuously dewatering an aqueous slurry containing said starch as raw starch grains, synthetic mineral fibers and a small quantity of asbestos fibers and thereby forming a wet fiber mat, the improvement which comprises agitating a supply of synthetic mineral fibers in nodulated form in a limited supply of water containing said raw starch grains and thereby in part defibering nodules and opening up residual nodules for receipt of starch grains within opened-up nodules, adding more water and forming a slurry to be dewatered, said slurry containing solids consisting essentially of from 5 to 20 parts of the raw starch grains and from 77 to 100 parts of feltable fibers of which from 77 to 90 parts are mineral fibers, in turn consisting of 75 to 88 parts of the resulting synthetic mineral fibers and nodules, and from 2 to 15 parts of asbestos fibers for retaining at least 80% of said starch grains in dewatering, any remainder being substantially unhydrated cellulose fibers, gelatinizing the starch grains in situ in the wet mat by heating the wet mat throughout to at least the gelatinizing temperature for the starch, and drying the resulting wet mat containing said gelatinized starch as binder for the fibers.

References Cited in the file of this patent

UNITED STATES PATENTS

| | | |
|---|---|---|
| 2,197,463 | Bradner | Apr. 16, 1940 |
| 2,217,005 | Clapp | Oct. 8, 1940 |
| 2,225,100 | Clapp | Dec. 17, 1940 |
| 2,717,830 | Bjorkman | Sept. 13, 1955 |
| 2,732,295 | Hollenberg | Jan. 24, 1956 |
| 2,773,763 | Scott | Dec. 11, 1956 |
| 2,773,764 | Park | Dec. 11, 1956 |